April 26, 1966 R. V. MATHISON 3,247,848
ARTICLES AND PROCESSES FOR PRODUCTION THEREOF
Filed July 6, 1964 2 Sheets-Sheet 1
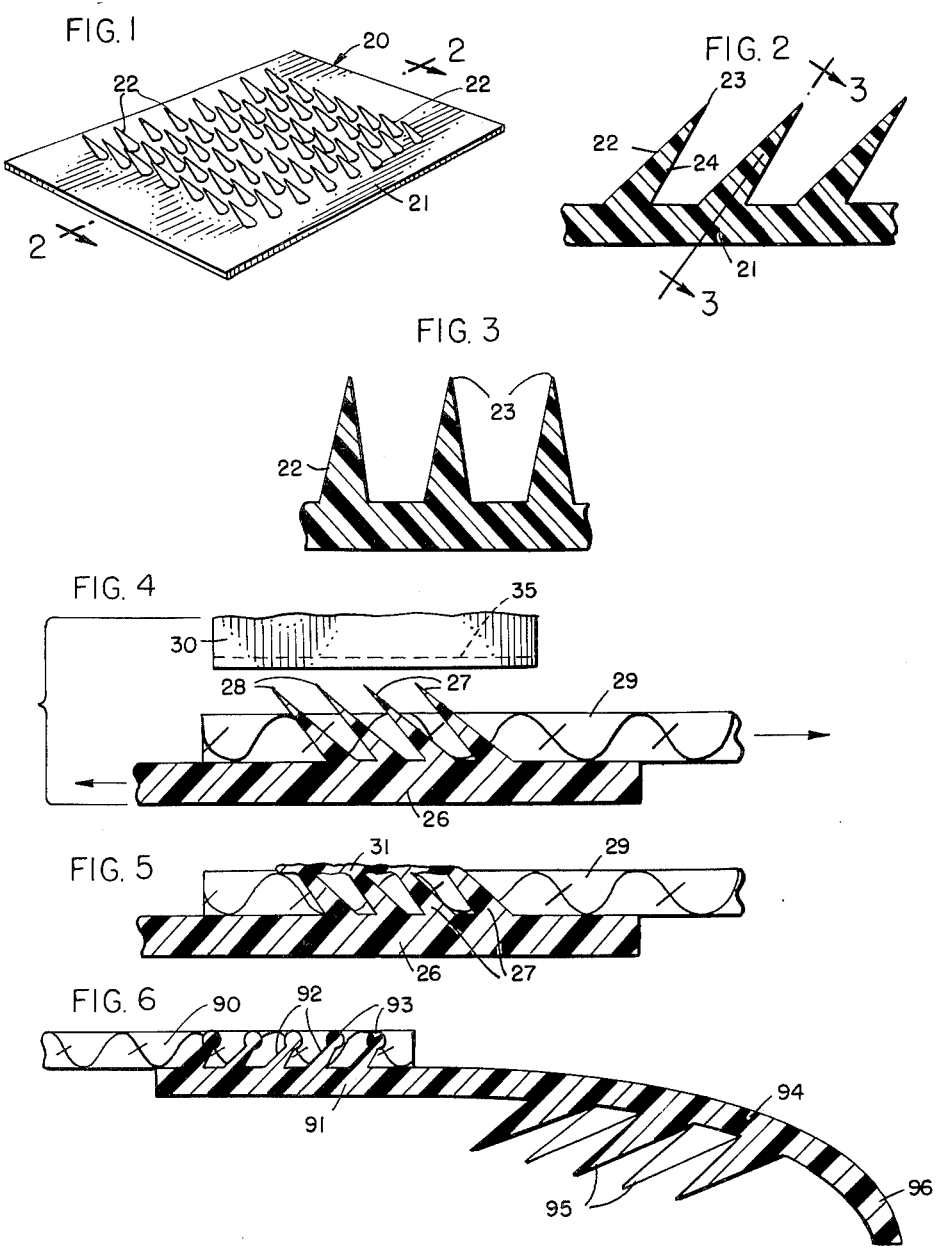
INVENTOR:
ROBERT V. MATHISON
BY
ATT'YS April 26, 1966  R. V. MATHISON  3,247,848
ARTICLES AND PROCESSES FOR PRODUCTION THEREOF
Filed July 6, 1964  2 Sheets-Sheet 2
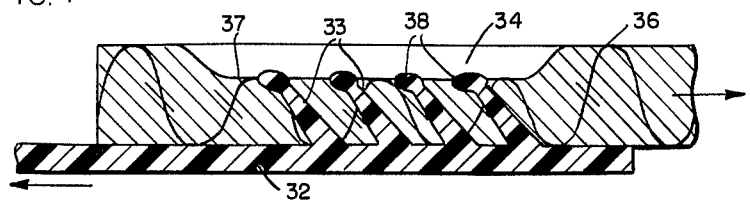
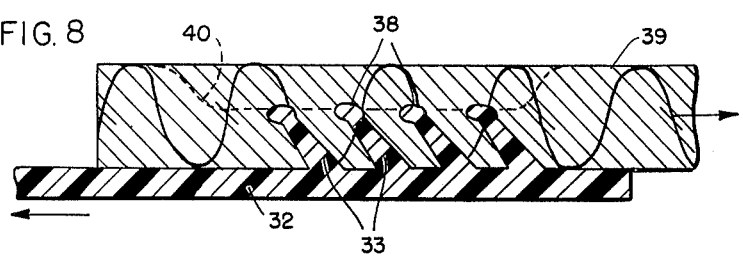
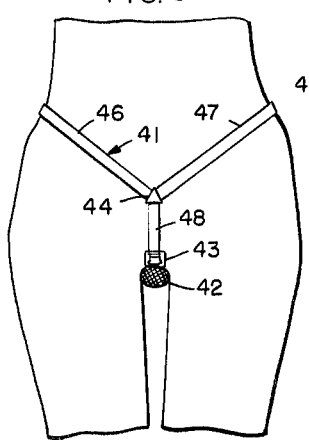
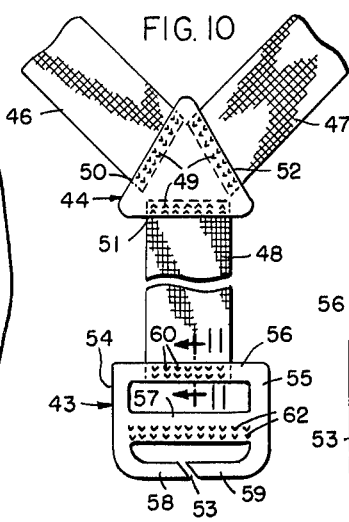
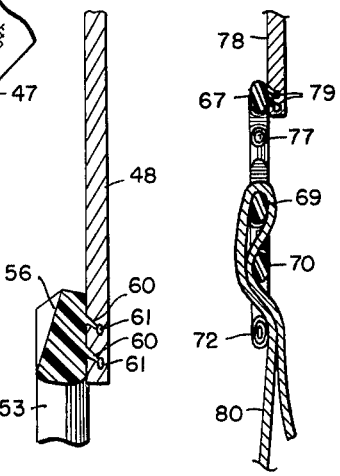
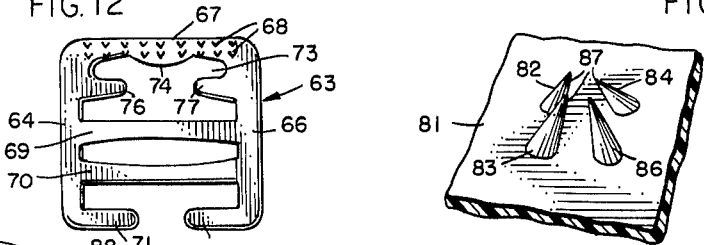
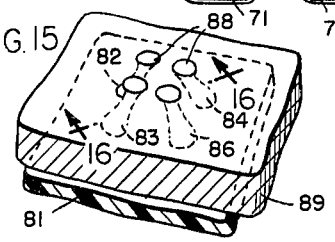
INVENTOR:
ROBERT V. MATHISON
BY
ATT'YS

United States Patent Office 3,247,848
Patented Apr. 26, 1966

3,247,848
ARTICLES AND PROCESSES FOR
PRODUCTION THEREOF
Robert V. Mathison, 5 Woodcrest Road,
Asheville, N.C.
Filed July 6, 1964, Ser. No. 380,575
15 Claims. (Cl. 128—171)

This invention in general pertains to devices or articles comprising a penetrable or porous member and a second member having thermoplastic polymer projections fixedly secured therein. More particularly, the invention pertains to porous or penetrable articles such as textiles and the like having a member with tapered thermoplastic polymer projections embedded therein with the outer ends of said projections enlarged after embedding the projections in said member, whereby the member is rigidly secured to the porous or penetrable article.

The invention herein disclosed has many practical uses. For example, the invention can be used to attach a clasp or buckle member to a piece of fabric such as a belt, a strap, a piece of cloth, a porous sponge, etc. The invention also can be used to secure a gripper member to the end of an elastic bandage such as an elastic knee wrap. It further can be used to attach plastic members to paper, thermoplastic sheets or films which are penetrable by relatively sharp, small projections, and like materials.

Briefly, the fastening means comprises a plurality of tapered, preferably relatively sharply pointed, closely spaced, preferably slanting projections made of thermoplastic synthetic polymers. These projections ordinarily are molded integrally with the member to be attached to the porous member, but they can also be molded integrally with a base member and the latter in turn can be connected to the member to be attached to the porous or penetrable member. The aforesaid projections are embedded in the porous or penetrable member by techniques hereinafter described in greater detail, after which the outer ends of the projections are softened under heat and pressure whereby these outer ends deform into enlarged portions which securely seat the projections in the porous or penetrable member. In this fashion, the member containing the projections is securely held on the porous member.

It is therefore a primary object of the invention to provide porous or penetrable members having securely attached thereto by novel fastening means a second member.

Another object of the invention is to provide means for attaching a member to a porous or penetrable article through the utilization of thermoplasticaly deformable, small, thermoplastic polymer projections which are deformed after said projections are seated in the article.

Still another object of the invention is to provide new and useful improvements in processes for securing a member having a plurality of closely spaced, tapered projections which are thermoplastically deformable on a porous member.

Still another object of the invention is to provide improvements of the aforesaid character wherein the ends of the thermoplastically deformable projections are fused together in the deforming operation.

Still another object of the invention is to provide improvements in means for attaching straps, belts or the like to the second member through the utilization of projections of the aforesaid character.

A still another object of the invention is to provide improvements in the attachment of buckles and like clasping devices to a band, strap or the like.

A still another object of the invention is to provide improvements in supporting structures such as belts, undergarment panties, and the like for holding sanitary napkins.

A still further object is to provide improvements in elastic bandage structures.

The invention, its objectives and advantages, will be further appreciated from the following description of specific embodiments of the invention, which embodiments are illustrated in the drawings.

In the drawings:

FIGURE 1 is a perspective view of a thermoplastic polymer member having thermoplastic projections thereon;

FIGURE 2 is a fragmentary view in cross section taken on section plane 2—2 of FIGURE 1;

FIGURE 3 is a similar view taken on section plane 3—3 of FIGURE 2;

FIGURE 4 is a section, in fragment, of a member having projections of the aforesaid character piercing through a porous member, i.e., a textile, and a heating and pressure member in juxtaposition thereto;

FIGURE 5 is a similar view in section after the projecting tips of said projections in FIGURE 4 have been thermoplastically deformed and have been fused together to tightly hold the member on the porous member;

FIGURE 6 is a section, in fragment, of elastic bandage having a gripper member secured at one end thereof by the technique of the invention;

FIGURE 7 is a cross-sectional view showing a member having thermoplastic polymer projections of the aforesaid character embedded in a porous member with the tips deformed at the depressed surface of the member;

FIGURE 8 is a similar view showing the member with the thermoplastic projections and the enlarged tips embedded below the surface of the member, which member is resiliently compressable and returns to its original form after the heat and pressure application to deform the ends of the thermoplastic projections;

FIGURE 9 is a front elevation of the mid-section and upper thigh portion of a human body with a sanitary napkin and sanitary belt supported thereon;

FIGURE 10 is a fragmentary, enlarged view of a fragment of the sanitary belt of FIGURE 9;

FIGURE 11 is a fragmentary, side elevation, in section taken on section plane 11—11 of FIGURE 10;

FIGURE 12 is a top plan view of a slide type buckle embodying the fastening means of the invention;

FIGURE 13 is a secton, in fragment, of a buckle type device as shown in FIGURE 12 fixedly held on a strap member with a second strap member adjustably held in the buckle type device;

FIGURE 14 is a fragmentary view in perspective showing a different arrangement of the sloping projections wherein said projections taper to a point and are arranged in a rosette-type arrangement;

FIGURE 15 is a fragmentary, perspective view of the fastening arrangement of FIGURE 14 with the projections embedded in a porous member and the outer ends of the projections deformed into enlargements securing the two members together;

FIGURE 16 is a fragmentary, sectional view taken on section plane 16—16 of FIGURE 15.

Referring to the drawings, there is shown in FIGS. 1–3 a supporting structure or plate 21 of a synthetic polymer having a plurality of smooth-sided, substantially rigid, closely spaced projections 22 integrally formed on one side of the supporting structure and tapering from their bases to relatively sharp tips or outer ends. For purposes of this invention, these projections are composed of a synthetic polymer which is thermoplastically deformable at temperatures above atmospheric temperature, preferably above about 50° C., and which is solid and relatively rigid at atmospheric temperature. More specifically, these thermoplastic polymers are ones in which the outer ends or tips of the projections can be softened and deformed without melting the projections.

The projections 22 preferably extend outwardly from the supporting structure at an angle of the longitudinal axes of 30–80°. They are preferably closely spaced in parallel rows or in groups such as a rosette-type arrangement. For some purposes, it is advantageous to have these projections sloping in the same general direction with the parallel rows close enough together so that the tips of the projections in one row extend above the sides, or partially overlap, the projections in the next adjacent row. In other words, if a vertical line were drawn from the tip of one projection toward the base, it would intersect the side of the projection in the next adjacent row.

The projections are preferably conical or pyramidal, although wedge shapes or other shapes of tapered projections may be employed. They are preferably spaced from one another at their bases a distance of about 0.03 to 0.10 inch. The center-to-center spacing of their tips preferably is in the range of about 0.03 to 0.25 inch. The size of the bases of the projections preferably is at least 0.03 inch in one dimension. The vertical height of the tips of the projections from the supporting structure is preferably within the range of 0.03 to 0.15 inch. The number of projections is preferably the equivalent to about 200 to 500 projections per square inch of the portion of the base or supporting structure occupied by the projections.

When the projections 22 slope from the base or supporting structure 21 to relatively pointed tips or outer ends 23, the shortest side 24 of the projections is advantageously also at an acute angle relative to the base or supporting structure 21. This angular side 24 helps to drive or seat projections 22 deeper in a porous material when a tension force is applied to the porous material in a direction parallel with the plane of the base 21 and opposite in direction to the direction of slope of the projections 22. Under these conditions, the material penetrated by the projections 22 tends to work down the angular side 24 of the projections and thus become more deeply seated on the projections.

FIGS. 4 and 5 show one of the techniques of the invention for firmly securing a member 26 with projections of the aforesaid character 27 in an open, porous member 29, i.e., a piece of textile. In this case the projections are arranged in parallel rows with the tips 28 overlapping the bases of the projections in the adjacent rows. The projections have sufficient length so that the tips 28 penetrate completely through the textile.

The member 26 is firmly secured on the porous member 29 by bringing a heated pressure plate 30 downwardly into contact with the projecting tips 28. The member 30 heats these tips to a temperature in the softening range of the polymer. The temperature, however, preferably does not reach the melting point of the polymer. As the heated pressure plate 30 is pushed downwardly against the tips 28, they are deformed and bent into a mass 31 (FIG. 5) in which the overlapping tips become united with the next adjacent projection. The mass 31 lies firmly against the side of the porous member 29 opposite the base member 26 whereby the projections are seated firmly in the porous member. In order to orient the tips 28 so that at least some of them join together under heat and pressure, the contacting face of the heated pressure plate 30 may have a plurality of small grooves 35 which serve as guides in the bending deformation of the tips 28 and keep them from spreading in diverse directions.

Another technique for securing the projections in a porous member is shown in FIGS. 7 and 8. It comprises pushing into the porous member 36 the integrally formed, sloping, tapered projections 33, which initially have substantially pointed outer ends (shown in phantom lines 34 in FIG. 7), of member 32 of thermoplastic polymer of aforesaid character and deeply seating these projections by pulling the member 32 and the porous member 36 in the directions indicated by the arrows. While maintaining this pulling force, a heated pressure plate is pressed against the upper surface of porous member 36. In the case illustrated in FIG. 7, the initial length of the pointed projections is less than the thickness of the porous member so that the tips do not project outwardly therethrough. The heated pressure plate is pushed against the porous member 36 to form a depression 37 in the upper surface thereof. In so doing, the tips or outer ends of the projection 33 are softened and form knobs or enlargements 38 which resist separation of the porous member 36 from the member 32. In the embodiment illustrated in FIG. 7, the depression 37 remains after withdrawing the heated pressure plate because the porous material 36 is nonelastically heat-deformable. In the embodiment of FIG. 8, the porous material 39 has an elastic recovery after the heated plate has pushed the material into the shape of the cavity 40 so that the material springs back after withdrawal of the pressure plate, leaving the knobs for enlargements 38 buried in the body of the porous material 39 instead of at the surface of the depression as shown in FIG. 7.

The invention as aforedescribed has many practical applications, several of which are illustrated in preferred embodiments of FIGS. 6 and 9 through 13.

In the embodiment of FIGS. 9 and 10, the invention is employed in two parts of a supporting structure for catamenial bandages or sanitary napkins. The supporting structure 41 shown in FIGS. 9 and 10 is one utilized to removably hold a catamenial bandage 42 by means of a clasp member 43 removably gripping the opposite ends of the catamenial bandage.

The supporting structure 41 is a belt-like structure having a thermoplastic polymer juncture member 44 on the front and rear portions thereof. The juncture member 44 joins the side bands or strips 46 and 47 adapted to fit about the waist of the wearer and downwardly depending front and rear strips 48, on the lower ends of which is secured the clasp member 43.

As illustrated in the detail of FIG. 10, the triangular juncture member 44 has a plurality of closely spaced, sloping projections 49 along the three edges 50, 51 and 52 thereof. These projections are seated in the fabric, usually elastic, strips or bands 46, 47 and 48, in the manner previously described, and the tips of the projections are deformed under heat and pressure as aforedescribed to provide secure attachment of said bands or strips to the juncture member 44.

The clasp members 43 may be attached similarly to the lower ends of the front and rear strips 48. The clasp members 43 comprise side bars 54 and 55, an upper cross-bar 56, a midcross bar 57, and inwardly directed legs 58 and 59 having a small space 53 between the opposed ends thereof. The upper bar 56 has a plurality of projections 60 which are seated in the lower ends of the strips 48 in the manner previously described. These projections are then deformed under heat and pressure as aforedescribed to soften and enlarge the tips of the projections 60 and thereby secure the clasp member 43 on the strip.

The cross bar 57 also has a plurality of projections 62 of the aforedescribed character, which projections are arranged in parallel rows and slope in a direction toward the legs 58 and 59. The projections 62 are not heated and deformed, but rather are used as releasable holding means for the fabric ends of the catamenial bandage. These fabric ends are inserted through the upper opening between the cross bars 56 and 57 from the side opposite on which the projections 62 appear, thereafter inserted in the slot between the bar 57 and the legs 58 and 59, and the fabric ends are drawn until the bandage is securely in place. The projections 62, in this process, will become seated in the fabric ends and will act against withdrawal of the fabric ends from the clasp. When it is desired to remove the bandage, the fabric end is removed from the lower slot by drawing it through space 53 whereby the fabric becomes unseated from projections 62 and can be drawn from the clasp.

FIG. 11 shows a section through the upper cross bar 56 and a fragment of the strip 48. It shows the knobs or enlargements 61 formed on the ends of the projections 60 after the application of pressure and heat as aforedescribed.

The illustrated embodiment relates to a sanitary napkin belt, but it is also contemplated that clasps like clasps 43 can be attached in the same manner to straps or other parts of panties, girdles or like undergarments as the means for holding the sanitary napkins.

FIGS. 12 and 13 illustrate a slip-type clasp of the type used on ladies' undergarments. This clasp 63 comprises side bars 64 and 66, and upper cross bar 67 and a plurality of projections 68 of the aforesaid character and cross bars 69 and 70. The lower end of the fastener has a pair of inwardly-directed legs 71 and 72. The upper opening 73 is defined by a curved wall 74 in the lower side of the bar 67 and by inwardly-extending ears 76 and 77.

This type of clasp is used on garments having adjustable straps. One end of a strap 78 is secured on the projections 68 in the manner aforedescribed and, after heat and pressure application, the projections 68 are secured in the strap by formation of knobs or enlargements 79 made by the deformation of the outer ends of the projections as aforedescribed. The other portion of the adjustable strap comprises a strap portion 80 which is looped through the clasp in the manner shown in FIG. 13 whereby the overall length of the combined straps 78 and 80 can be adjusted.

FIGS. 14 through 16 show another embodiment of the thermoplastic polymer members having thermoplastic polymer projections. In this case, the projections, instead of extending in the same direction, are arranged in a rosette pattern whereby the projections 82, 83, 84 and 86 slope toward a common point above and between the projection. In this embodiment a thermoplastic polymer base member 81 is formed with four tapered, small, sloping, projections 82, 83, 84 and 86 having their tips 87 in a relatively close relationship. An open, porous member such as a piece of cloth, or the like, is worked into the space between the projections until the projections are securely seated therein. The tips 87 of the projections are deformed under heat and pressure application as aforedescribed to provide knobs or enlargements 88 which firmly seat the projections in the porous member. This arrangement of projections is especially useful in applications where the pull of the porous member against the projections can be in any one of several directions. The sloping of the projections 82, 83, 84 and 86 in different directions always provides at least one projection which is slanted opposite to the direction of pull so that the projections are less likely to work out of the porous member. Furthermore, if desired, the projections may have their tips 87 so closely aligned that they form a united mass when deformed under heat and pressure application.

FIG. 6 shows another practical application of the invention. In this embodiment an elastic wrap-around bandage 90 of the character normally used in the wrapping of joints, sprains, or the like, has secured at one end thereof a clip element 91 made of a thermoplastic polymer of the aforesaid character. This clip element is secured to the end of the bandage strip 90 by utilization of projections 92 with the tips thereof initially in a relatively pointed condition but deformed under heat and pressure application into enlargements or knobs 93 as aforedescribed. The clip has a curved segment 94 having a plurality of sloping projections 95 arranged in parallel rows and sloping in a general direction opposite to the slop of the projections 92. The small, tapered, relatively sharp projections 95 are provided on the end of the bandage which is the outer winding so that the projections 95 can be seated in the interstices of the elastic bandage layers beneath the outer winding and thereby hold the outer winding tightly against the wrapped bandage. As long as tension is maintained in the outer end of the elastic bandage, the projections 95 remain firmly seated. The projections 95, however, can be lifted out of the bandage when it is desired to remove the same. If desired, the outermost end of the clip 91 may have a relatively sharply curved segment 96 which helps guard against accidental catching of the outer end of the clip and unseating of the projections 95.

The most preferred thermoplastic polymers for the invention are those which do not melt sharply and can be deformably heat softened and deformed without melting. Examples thereof are Celcon, (a high impact strength ethyl cellulose thermoplastic), Delrin, (a polyformaldehyde polymer) and polypropylene. Thermoplastics, such as nylon are less preferred because of their sharper melting points.

The aforesaid porous members to which the invention pertains may be made of any material which is not adversely weakened or destroyed under the heat and pressure applications required for softening and deforming the thermoplastic polymer projections. While not limited thereto, examples of such materials are knit nylon, such as that used in ladies' stockings, Islon, open weave material, such as Spandex and Lycra, vinyl sheets and coverings, elastic, knitted or woven materials, paper and almost any type of textile fabric. Also, materials such as cellular sponge materials made of synthetic, foam polymers, and the like, can be used as the porous materials.

The invention is hereby claimed as follows:

1. An article which comprises a member with a segment having a plurality of closely spaced, small, tapered projections extending outwardly therefrom, said projections being made of a heat-deformable, thermoplastic polymer, a second member held tightly against said segment with said projections penetrating said second member, and the outer ends of said projections being deformed by heat softening and compression of said outer ends and forming enlargements on said outer ends tightly secured against said second member.

2. An article as claimed in claim 1 wherein said enlargements are positioned within the body of said second member.

3. An article as claimed in claim 1 wherein said enlargements are positioned against the surface of said second member opposite the surface on which said segment is located.

4. An article as claimed in claim 1 wherein said enlargements are positioned against the surface of said second member opposite the surface on which said segment is located and at least some of the outer ends of said projections are fused together.

5. A process for securing together a porous member and another member with projections penetrating said porous member, which process comprises penetrating a porous member with a plurality of closely spaced, small, tapered projections extending outwardly from another member, said projections being made of a thermoplastic polymer, and applying pressure and heat against the outer ends of said projections sufficient to soften and deform said outer ends and to form enlargement tightly securing said projections in said porous member.

6. A process for securing together a porous member and another member with projections penetrating said porous member, which process comprises penetrating a porous member with a plurality of closely spaced, small, tapered projections sloping outwardly from another member, said projections being made of a thermoplastic polymer, said projections further sloping in substantially the same direction, tensioning said porous member to provide a tensile force thereon in the direction opposite to the slope of said projections to securely seat said projections in said porous member, and applying, while maintaining said tensioning, pressure and heat against the outer ends of said projections sufficient to soften and deform said outer ends and to form enlargements tightly securing said projections in said porous member.

7. A process as claimed in claim 5 wherein the outer ends of said projections penetrate completely through the said porous member, and said enlargements are formed on the surface of said porous member.

8. A process as claimed in claim 7 wherein at least some of said outer ends of said projections are fused together by said application of heat and pressure.

9. A process as claimed in claim 5 wherein the outer ends of said projections are within the body of said porous member, and said heat and pressure are applied against said porous member with sufficient heat and force to cause said outer ends to deform.

10. A support adapted to hold a catamenial bandage on the human body comprising strap members extending toward and having ends joined to a juncture member made of a thermoplastic polymer, said member having a plurality of closely spaced, small projections penetrating said straps, and the outer ends of said projections being deformed by heat softening under compression of said outer ends to form enlargements tightly securing said straps to said juncture member.

11. A support as claimed in claim 10 wherein one of said straps has on its opposite end a gripping member with means adapted to grip releasably an end of a catamenial bandage, said gripping member being made of a thermoplastic polymer and having a plurality of closely spaced, small projections penertating said strap, and the outer ends of said projections being deformed by heat softening under compression of said outer ends to form enlargements tightly securing said straps to said gripping member.

12. A support adapted to hold a catamenial bandage on the human body comprising support means adapted to fit about and be supported by the human body, a strap attached to said support means, a gripping member having means to grip releasably an end of a catamenial bandage, said gripping member being made of a thermoplastic polymer and having a plurality of closely spaced small projections penetrating said strap, and the outer ends of said projections being deformed by heat softening under compression of said outer ends to form enlargements tightly securing said strap to said gripping member.

13. An elastic bandage comprising an elongated, elastic fabric having secured on one end thereof a thermoplastic polymer clip element, said clip element having a plurality of closely spaced, tapered, small, thermoplastic polymer projections embedded in the fabric at said end, said projections sloping in a direction toward said end, the outer ends of said projections being heat deformed into enlarged portions securing said projections against displacement from said fabric, and a plurality of small, tapered, closely spaced projections on a portion of said clip element extending beyond said end, the last-mentioned projections sloping toward said end in a direction opposite to the slope of said first-mentioned projections.

14. A slide-type fastener comprising a thermoplastic polymer member having a plurality of bars defining openings into which a strap may be looped and adjustably held, a plurality of closely spaced, tapered, small thermoplastic polymer projections on said member, and a fabric member which is attached to said first-mentioned member by embedding of said projections in said fabric member and heat-deforming of the outer ends thereof to form enlargements securing said projections in said fabric member.

15. An article which comprises a member with a segment having a plurality of closely spaced, small, tapered projections at angles from one another, said projections being made of a heat-deformable, thermoplastic polymer, a second member held tightly against said segment with said projections penetrating said second member, and the outer ends of said projections being deformed by heat softening and compression of said outer ends and forming enlargements on said outer ends tightly secured against said second member.

No references cited.

ADELE M. EAGER, *Primary Examiner.*